United States Patent
Harris

(10) Patent No.: US 8,954,058 B2
(45) Date of Patent: Feb. 10, 2015

(54) TELEPHONY INTERRUPTION HANDLING

(71) Applicant: Nokia Siemens Networks Oy, Espoo (FI)

(72) Inventor: John M. Harris, Glenview, IL (US)

(73) Assignee: Nokia Siemens Networks Oy, Espoo (FI)

( * ) Notice: Subject to any disclaimer, the term of this patent is extended or adjusted under 35 U.S.C. 154(b) by 140 days.

(21) Appl. No.: 13/645,599

(22) Filed: Oct. 5, 2012

(65) Prior Publication Data

US 2014/0099943 A1 Apr. 10, 2014

(51) Int. Cl.
*H04W 24/00* (2009.01)
(52) U.S. Cl.
USPC .......................... 455/425; 455/423; 455/424
(58) Field of Classification Search
CPC ..... H04W 24/00; H04W 24/02; H04W 24/04; H04W 24/08
USPC ................................................. 455/423–425
See application file for complete search history.

(56) References Cited

U.S. PATENT DOCUMENTS

2011/0307246 A1* 12/2011 Singh .................................. 704/9
2014/0067405 A1* 3/2014 Patel et al. ..................... 704/500

OTHER PUBLICATIONS

Hammer, Florian, et al., "The Well-Tempered Conversation: Interactivity, Delay and Perceptual VoIP Quality", IEEE 2005, pp. 244-249.

* cited by examiner

*Primary Examiner* — Temica M Beamer
(74) *Attorney, Agent, or Firm* — Harrington & Smith

(57) ABSTRACT

The specification and drawings present a new method, apparatus and software related product for handling interruptions, specifically passive interruption (or unintended interruption) for telephone communications (e.g., wireless) between users or user equipments (e.g., in LTE wireless systems). At least one monitoring electronic device can detect one or more unintended interruptions in an audio communication between at least two UEs in one or both communication directions before each of the one or more unintended interruptions occur. Upon this detection, at least one monitoring electronic device can provide an instruction to facilitate a shortened audio delay for audio data in at least one communication direction to offset the one or more unintended interruptions. The embodiments described herein may be applies to wireless/mobile communications and non-wireless/landline communications.

19 Claims, 5 Drawing Sheets

TELEPHONY INTERRUPTION HANDLING

TECHNICAL FIELD

The exemplary and non-limiting embodiments of this invention relate generally to wireless communications and more specifically to passive/unintended interruption handling for telephone communications between user equipments (e.g., in wireless LTE systems).

BACKGROUND ART

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:
3GPP third generation partnership project
DL downlink
E-UTRA evolved universal terrestrial radio access
eNB, eNodeB evolved node B/base station in an E-UTRAN system
EPC evolved packet core
E-UTRAN Evolved UTRAN (LTE)
LTE long term evolution
LTE-A long term evolution advanced
QoE quality of experience
QoS quality of service
RAN radio access network
UE user equipment
UL uplink
UTRAN universal terrestrial radio access network Unintended/unintentional interruption or passive interruption is when two parties start speaking on the phone (while hearing silence from the other party) and continue speaking for a substantial period of time before they realize (or at least one party belatedly realizes) that the other party is also already speaking. The differentiation between an intentional interruption is that an intentional interruption occurs when one of the two parties can hear the speech of the other party and intentionally begin speaking (interrupts that speech), whereas in case of the unintended interruption, the first party starts (or continues) to speak while a second party also speaking simultaneously in real time but the first party cannot yet hear it because of a delay of the audio signal (e.g., in a buffer of the UE). This represents a major QoE challenge in telephone communication and especially in wireless communications between UEs.

SUMMARY

According to a first aspect of the invention, a method, comprising: detecting by at least one electronic device one or more interruptions in one or both communication directions in an audio communication between at least two user equipments before each of the one or more interruptions becomes audibly detectable at least at one of the user equipments; and in response to the detection, providing an instruction by the at least one electronic device to facilitate a shortened audio delay for audio data in the one or both communication directions to offset the one or more interruptions.

According to a second aspect of the invention, a receiving by a network element an instruction from at least one electronic device to facilitate a shortened audio delay for audio data in one or both communication directions in an audio wireless communication between at least two user equipments to offset one or more unintended interruptions; and providing by the network element the shortened audio delay for the audio data in one or both communication directions for an audio wireless communication between at least two user equipments to offset the one or more interruptions.

According to a third aspect of the invention, an apparatus comprising:
at least one processor and a memory storing a set of computer instructions, in which the processor and the memory storing the computer instructions are configured to cause the apparatus to: detect one or more interruptions in one or both communication directions in an audio communication between at least two user equipments before each of the one or more interruptions becomes audibly detectable at least at one of the user equipments; and in response to the detection, provide an instruction to facilitate a shortened audio delay for audio data in the one or both communication directions to offset the one or more interruptions.

According to a fourth aspect of the invention, an apparatus comprising: at least one processor and a memory storing a set of computer instructions, in which the processor and the memory storing the computer instructions are configured to cause the apparatus to: receive an instruction from at least one electronic device to facilitate a shortened audio delay for audio data in one or both communication directions in an audio wireless communication between at least two user equipments to offset one or more unintended interruptions; and provide the shortened audio delay for the audio data in one or both communication directions for an audio wireless communication between at least two user equipments to offset the one or more interruptions.

BRIEF DESCRIPTION OF THE DRAWINGS

For a better understanding of the nature and objects of embodiments of the invention, reference is made to the following detailed description taken in conjunction with the following drawings, in which.

DETAILED DESCRIPTION

Figure 1:
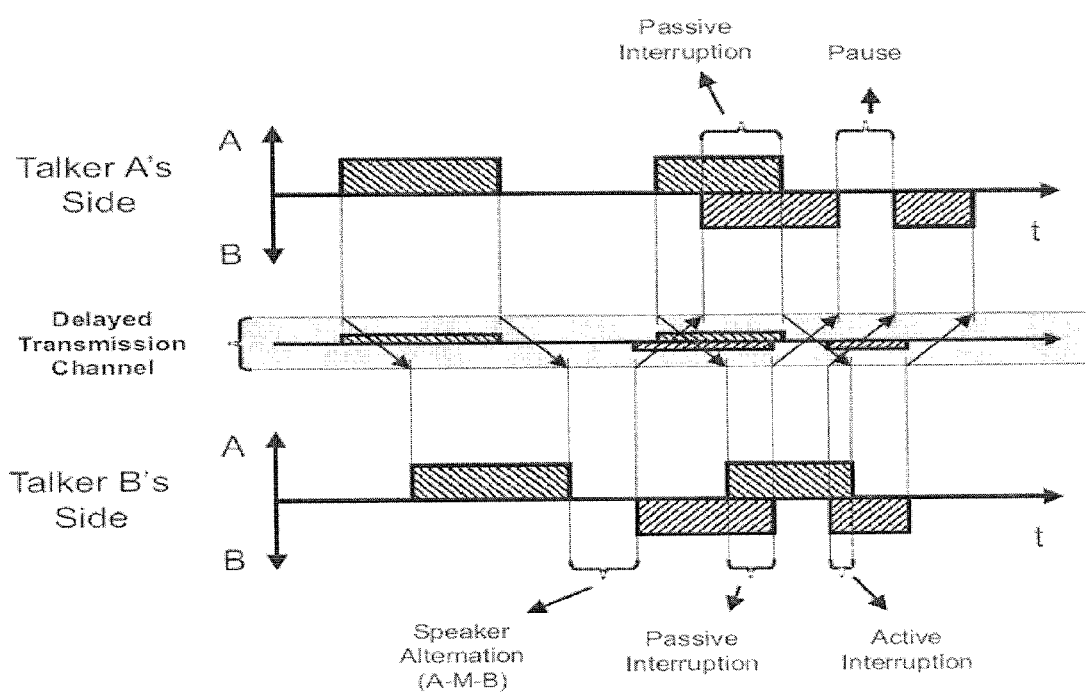
FIG. 1 is a prior art diagram demonstrating a simple example for the differences between the state sequence patterns with respect to a user/speaker A (above), to a user/speaker B (below) and to the absolute clock (depicted within transmission channel)

A major QoE challenge for telephony is the degradation resulting from longer one-way audio delay. The problem arrives when two different parties (unintentionally) start speaking, and continue speaking for some period of time before they realize that the other party is also speaking. This problem is depicted in FIG. 1 reproduced from FIG. 3 of the article "The well-tempered Conversation: Interactivity, Delay and Perceptual VoIP Quality", by F. Hammer, P. Reichl, and A. Raake, Communications, 2005. ICC 2005, 2005 IEEE International Conference Digital Object Identifier, on Volume 1, Issue 16-20 May 2005 Page(s): 244-249.

FIG. 1 illustrates a simple example for the differences between the state sequence patterns with respect to a user/speaker A (above), to a user/speaker B (below) and to the absolute clock (depicted within transmission channel). In this example, speaker B receives speaker A's delayed utterance/speech and responds after a certain think time. Note, that in total, B's response as perceived by the speaker A is delayed by one round-trip time. After some time, the speaker A starts to talk assuming that B is not responding to A's first talk-spurt. In reality, the delayed utterance of B interrupts the speaker A without intention: see passive interruption in the above talker A's side. At talker B's side, the speaker B is interrupted by the speaker A without intention which follows by the speaker B interrupting speaker A on purpose (active interruption).

A new method, apparatus, and software related product (e.g., a computer readable memory) are presented for handling interruptions, specifically passive interruption (or unintended interruption) for telephone communications (e.g., wireless) between users or user equipments (e.g., in LTE wireless systems). According to an embodiment of the invention, at least one monitoring electronic device can detect one or more unintended (passive) interruptions in an audio communication between at least two UEs (in principle it can be more than two UEs) in one or both communication directions before each of the one or more unintended interruptions becomes audibly detectable at least at one of the user equipments (i.e., one user can really hear another user). Upon this detection, at least one monitoring electronic device can provide an instruction to facilitate a shortened audio delay for audio data in at least one communication direction (in general it may be two or more communication directions) to offset (i.e., to reduce a negative impact of) the one or more unintended interruptions. The embodiments described herein may be applies to wireless/mobile communications, non-wireless/landline communications and/or their combination. The at least one (monitoring) electronic device may be called "an application optimization entity at the random access network edge". The UEs in wireless application may be mobile phones, camera mobile phones, wireless video phones and the like.

According to one embodiment, the at least one electronic device may be co-located with or may be a part of one of the at least two communicating UEs. In this case the instruction in response to at least one detected unintended interruption may be provided by the at least one electronic device to or within the one of the UEs to facilitate the shortened audio delay for the audio data, e.g., temporary saved in a buffer memory received by the one of the at least two UEs.

According to another embodiment, the at least one electronic device may be co-located with or may be a part of an eNB providing the audio wireless communication between the at least two UEs. Then the instruction in response to at least one detected unintended interruption may be provided by the at least one electronic device to or within the eNB to facilitate a shortened audio delay for the audio data sent to the one or at least two UEs.

According to a further embodiment, the at least one electronic device may be co-located with or may be a part of one eNB providing the audio wireless communication at least with a first of the two UEs and with a core network (e.g., EPC) which further provides the audio wireless communication using a further eNB with at least a second one of the at least two UEs (i.e., the second UE is supported by the further eNB). In this scenario in response to at least one detected unintended interruption, a first (partial) instruction may be provided by the at least one electronic device to or within the one eNB to facilitate a shortened audio delay for the audio data sent to the first UE. Also a second partial instruction may be sent to the further eNB through the core network. It is noted that the second partial instruction may not be necessary if the further eNB has a local application optimization entity at the random access network edge (i.e., a further monitoring electronic device) which can provide detecting of the passive interruption(s) and corresponding instruction locally. It is further noted that the one eNB may be aware of that (e.g., notified by the core network), so that it only should send the first (partial) instruction.

According to a still further embodiment, the at least one monitoring electronic device may detect a plurality of the unintended interruptions so that a rate of the unintended interruptions for a predefined period of time in the one or both communication directions may exceed a predetermined threshold value. In this case, the at least one electronic device may provide a further instruction to a network (eNB) to reduce a total delay for all audio data below a predetermined value in the corresponding one or both communication directions in the audio wireless communication between the at least two UEs.

Figure 2:
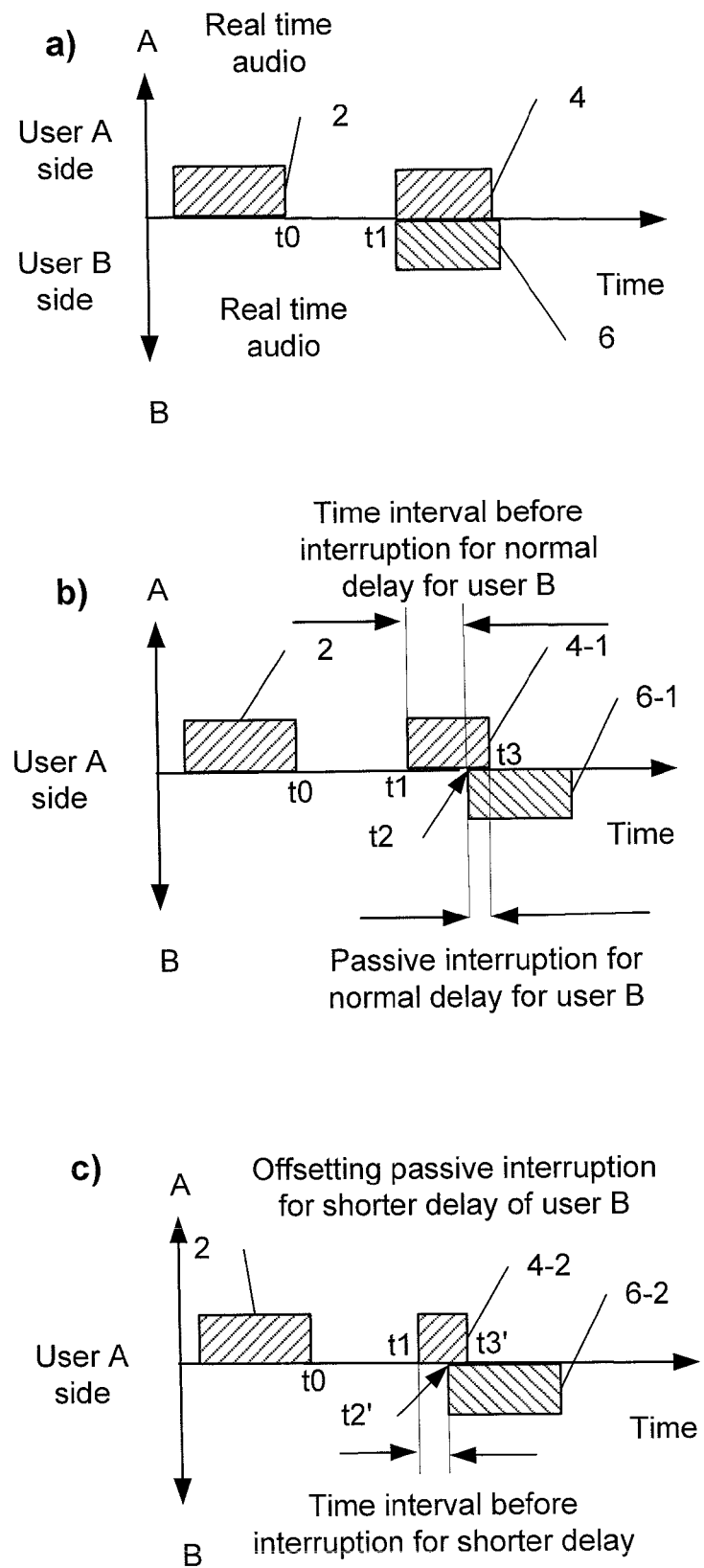
FIGS. 2a-2c are diagrams demonstrating an operational principle of offsetting one unintended interruption, according to an exemplary embodiment of the invention.

FIGS. 2a-2c show diagrams demonstrating an operational principle of offsetting one unintended interruption, according to an exemplary embodiment of the invention.

FIG. 2a shows in real time talk-spurts 2 and 4 of a user A and a talk-spurt 6 of a user B originated in response to the talk-spurt 2 of the user A. In this example, the talk-spurts 4 and 6 start simultaneously at approximately t1. It is noted that duration of the talk-spurt 4 in FIG. 2a is projected since the user A may stop talking shortly after hearing the talk-spurts 6 from the user B. The time t1 may be considered substantially a time when the at least one electronic device (the application optimization entity at the random access network edge) may detect the potential passive interruption between users A and B as explained herein. In reality it could be a short period of time (e.g., 5-10 ms) from the moment both parties started to talk simultaneously before the at least one electronic device may detect a potential passive interruption.

FIG. 2b shows the talk-spurt 6 from the user B heard by the user A on the user A side using a normal delay of the talk-spurt 6, where t1-t2 is a time interval before the passive interruption occurs after the beginning of the talk-spurt 6-1 (which a delayed version of the talk-spurt 6). After the user A hears the talk-spurt 6-1 at the time t2, it may stop talking shortly after that at the time t3, so that the "normal" duration (with normal delay of the talk-spurt 6-1) of the talk-spurt 4-1 is t1-t3. Typically, the time interval (delay) t1-t2 may be over 250 ms.

FIG. 2c shows talk-spurt 6-2 from the user B heard by the user A on the user A side using a shorter delay of the talk-spurt 6-2 according to one of the embodiment described herein. The delay of the talk-spurt 6-2 is provided by a corresponding device such as eNB or UE, as described herein, in response to the instruction from the at least one electronic device which detected the potential passive interruption substantially at the time t1 (or shortly, 5-10 ms, after that). With the shortened delay for the talk-spurt 6-2, the user A starts hearing the talk-spurt 6-2 at the time t2' which is earlier than the time t2 in FIG. 2b, so the time interval t1-t2' before the passive interruption occurs after the beginning of the talk-spurt 4-2 in FIG. 2c is shorter than the corresponding time interval t1-t2 in FIG. 2b with a normal delay for the talk-spurt 6-1. Typically, the time interval t1-t2' may be about 100-200 ms. As a result, after the user A starts hearing the talk-spurt 6-2 at the time t2', it may stop talking shortly after that at a time t3' in FIG. 3c which is earlier than the time t3 in FIG. 2b. This reduction in user A's reaction to the talk-spurt 6-2 of user B improves QoE of a telephone conversation between users A and B.

From FIGS. 2a-2b it can be demonstrated how the unintended (passive) interruption may be detected by the monitoring electronic device. At least one unintended interruption may be detected using the following steps:

detecting a silent interval (t0-t1) in FIG. 1a from a first user equipment (user A) of the at least two user equipments followed by a first speech interval 4 of the user A;

detecting a further silent interval (at least t0-t1, actually it is longer than t0-t1, not shown in FIG. 1a) from a second user equipment (user B) of the at least two user equipments overlapping with the silent interval from the user A followed by a second speech interval 6 of the user B; and detecting that at least one of the following:

the first speech interval 4 has not yet begun playout at the user B, and the second speech interval 6 has not yet begun playout at the user A.

It is also noted that according to a further embodiment, each of the silent and further silent intervals (e.g., t0-t1) may be longer than a predetermined value for detecting the unintended interruption.

There are many possible variations of the concept demonstrated in FIGS. 2a-2c. For example, according to another embodiment, the user B may send the talk-spurt 6 (started in real time after the talk-spurt 2 of the user A) to the user A long before the user A starts its talk-spurt 4. The talk-spurt 6 may be stored in the buffer of the user A's UE. Then as soon user A starts its talk-spurt 4, the at least one monitoring electronic device may detect that and provide instructions to the user A's UE to skip a silent period preceding the talk-spurt 6 from the user B and start playing the talk-spurt 6 right away after starting the talk-spurt 4 by the user A (e.g., after only waiting for a playout buffer depth of one packet not 4 conventional voice packets). In this situation, the user A will realize very quickly that the user B is speaking and may stop talking shortly after that, thus improving QoE of a telephone conversation between users A and B.

According to a further embodiment, the shortened audio delay (e.g., shortening of the delay of the talk-spurt 6) may be provided using the instruction from the at least one electronic device which detected the potential passive interruption. In one option, the instruction may in general simply inform the network element such as eNB about potential passive interruption without providing specific instruction on how facilitate the shortened audio delay, so that the eNB configures how to do that. In another option the at least one electronic device may provide a more detailed instruction (e.g. to UE or eNB) on how to facilitate the shortened audio delay. The instruction (s) may comprise (but are not limited to) one or more of:

a) providing a higher priority of audio data within a video telephone call, b) providing a higher priority of audio data for the UE vs. other UEs, c) using additional radio resources to reduce the audio delay, d) compressing (e.g., further compressing) audio/video data for a video telephone call, e) using additional radio resources in order to further reduce latency for a specific talk-spurt, f) modifying packet content, e.g., removing silent period, as explained herein, etc.

In a further embodiment, if the case of f) being used, the system (e.g., monitoring device) will also preferably trigger the use of a), b), c) and/or d) for the remainder of the talk-spurt. The logic here is as follows, if the receiving device begins playing out audio sooner than is typical, e.g., after only waiting for 20 ms of audio to arrive rather than a conventional 80 ms, then the risk of audio jitter causing the playout buffer to run out (and thereby causing a gap or stuttering within the audio playout) is greater. For this reason the detecting device would preferably indicate to the network (e.g., eNB) that a), b), c) and/or d) is also needed, such that the amount of jitter or delay can be reduced for the duration of the talk-spurt, matching the shorter delay buffer which the receiving device has "committed itself" to by beginning playout earlier than normal in case of f). In other words, once the audio playout begins, this sets the deadline by which each subsequent audio packet within that a talk-spurt must be received, such that if the start of the talk-spurt (a new speech utterance/sense) playout begins earlier, then each subsequent audio packet must also be received by a correspondingly earlier deadline, i.e., the ith packet within the utterance is due by i*20 ms after the first packet in the utterance begins playout. From that point of view, a), b), c) and/or d) might also be referred to as a QoS boost or a packet delay budget reduction.

Figure 3:
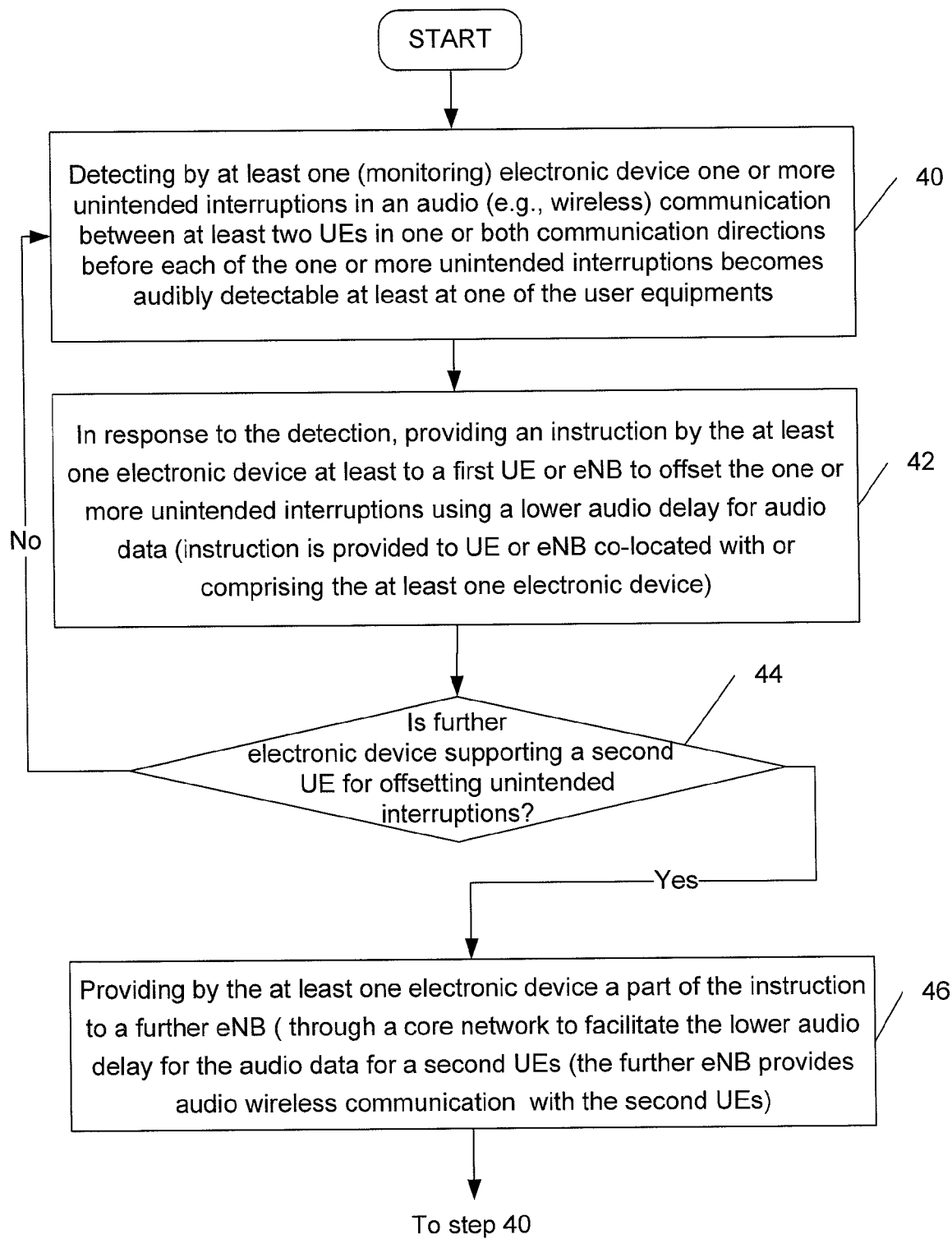
FIG. 3 is a flow chart demonstrating exemplary embodiments of the invention performed by a monitoring electronic device for handling passive interruptions.

FIG. 3 shows an exemplary flow chart demonstrating implementation of embodiments of the invention by at least one monitoring electronic device (e.g., an application optimization entity at the random access network edge). It is noted that the order of steps shown in FIG. 3 is not absolutely required, so in principle, the various steps may be performed out of the illustrated order. Also certain steps may be skipped, different steps may be added or substituted, or selected steps or groups of steps may be performed in a separate application.

In a method according to the exemplary embodiment shown in FIG. 3, in a first step 40, the at least one monitoring electronic device detects one or more interruptions (e.g., unintended interruptions) in an audio (e.g., wireless) communication between at least two UEs in one or both communication directions before each of the one or more unintended interruptions becomes audibly detectable at least at one of the user equipments in reality (i.e., one user can really hear another user).

In a next step 42, in response to the detection in step 40, the at least one monitoring electronic device provides an instruction at least to a first UE or eNB to offset the one or more unintended interruptions using a shortened audio delay for the audio data (instruction is provided to the UE or eNB co-located with or comprising the at least one monitoring electronic device).

In a next logical step 44, it is determined whether a further monitoring electronic device (such as application optimization entity at the random access network edge) supports a second UE of the at least two UEs for offsetting unintended interruptions (this is the case when the at least two UEs are supported by different eNBs). If that is the case, the process goes back to step 40. If it is determined that there is no further monitoring electronic device supporting the second UE of the at least two UEs for offsetting unintended interruptions, then in a next step 46, the at least one monitoring electronic device provides a part of the instruction to a further eNB ((the further eNB supports by the second UE) through a core network to facilitate the shortened audio delay for the audio data for the second UE (the further eNB provides audio wireless communication with the second UE). Then the process goes back to step 40.

Figure 4:
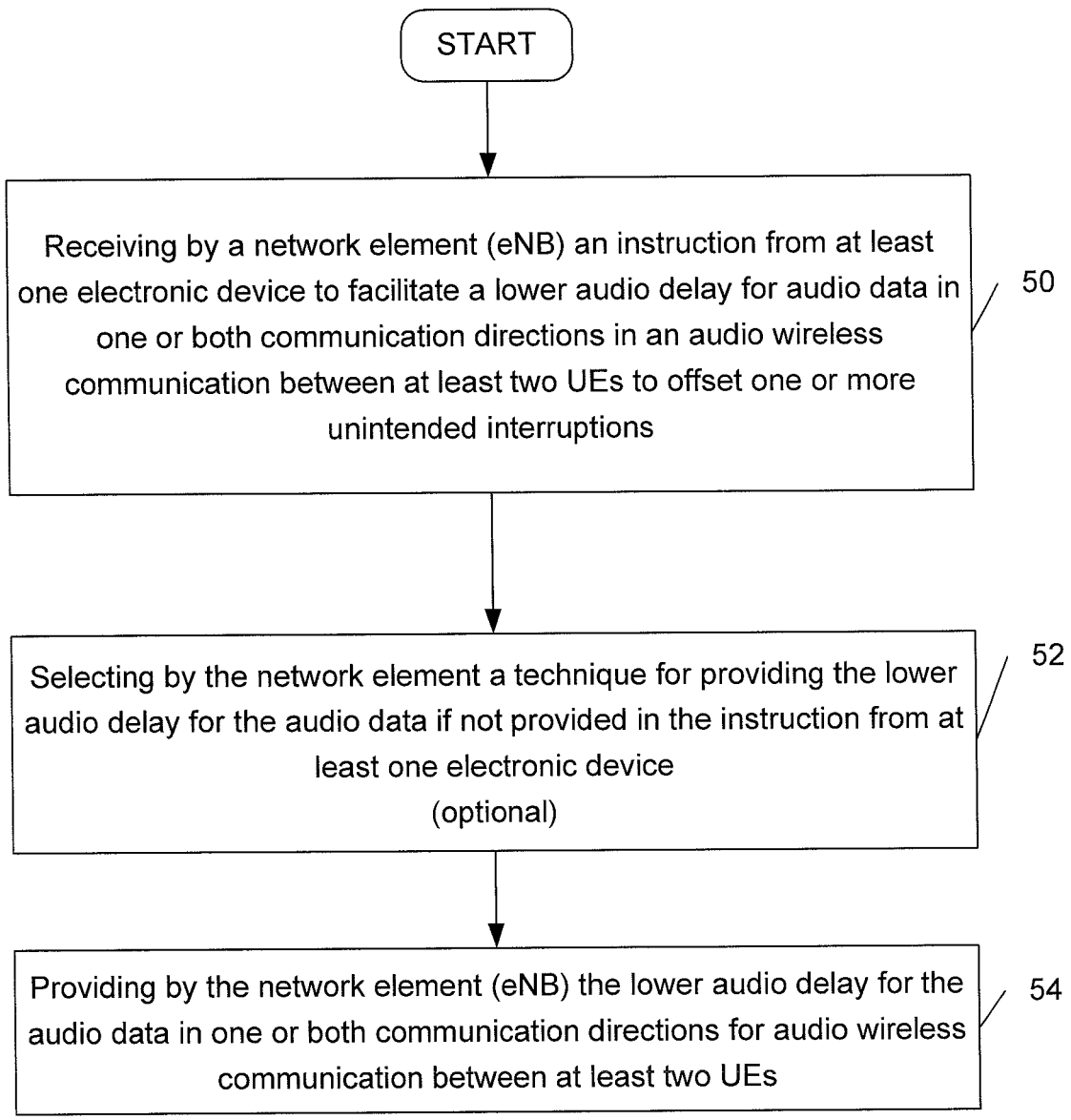
FIG. 4 is a flow chart demonstrating exemplary embodiments of the invention performed by a network element such as a network access node (eNB)

FIG. 4 shows an exemplary flow chart demonstrating implementation of embodiments of the invention by a network element (eNB). It is noted that the order of steps shown in FIG. 4 is not absolutely required, so in principle, the various steps may be performed out of the illustrated order. Also certain steps may be skipped, different steps may be added or substituted, or selected steps or groups of steps may be performed in a separate application.

In a method according to the exemplary embodiment shown in FIG. 4, in a first step 50, the network element such as eNB receives an instruction from at least one monitoring electronic device (e.g., an application optimization entity at the random access network edge) to facilitate a shortened audio delay for audio data in one or both communication directions in an audio wireless communication between at least two UEs to offset one or more interruptions such as unintended interruptions(the eNB is co-located with or comprising the at least one monitoring electronic device).

Figure 5:
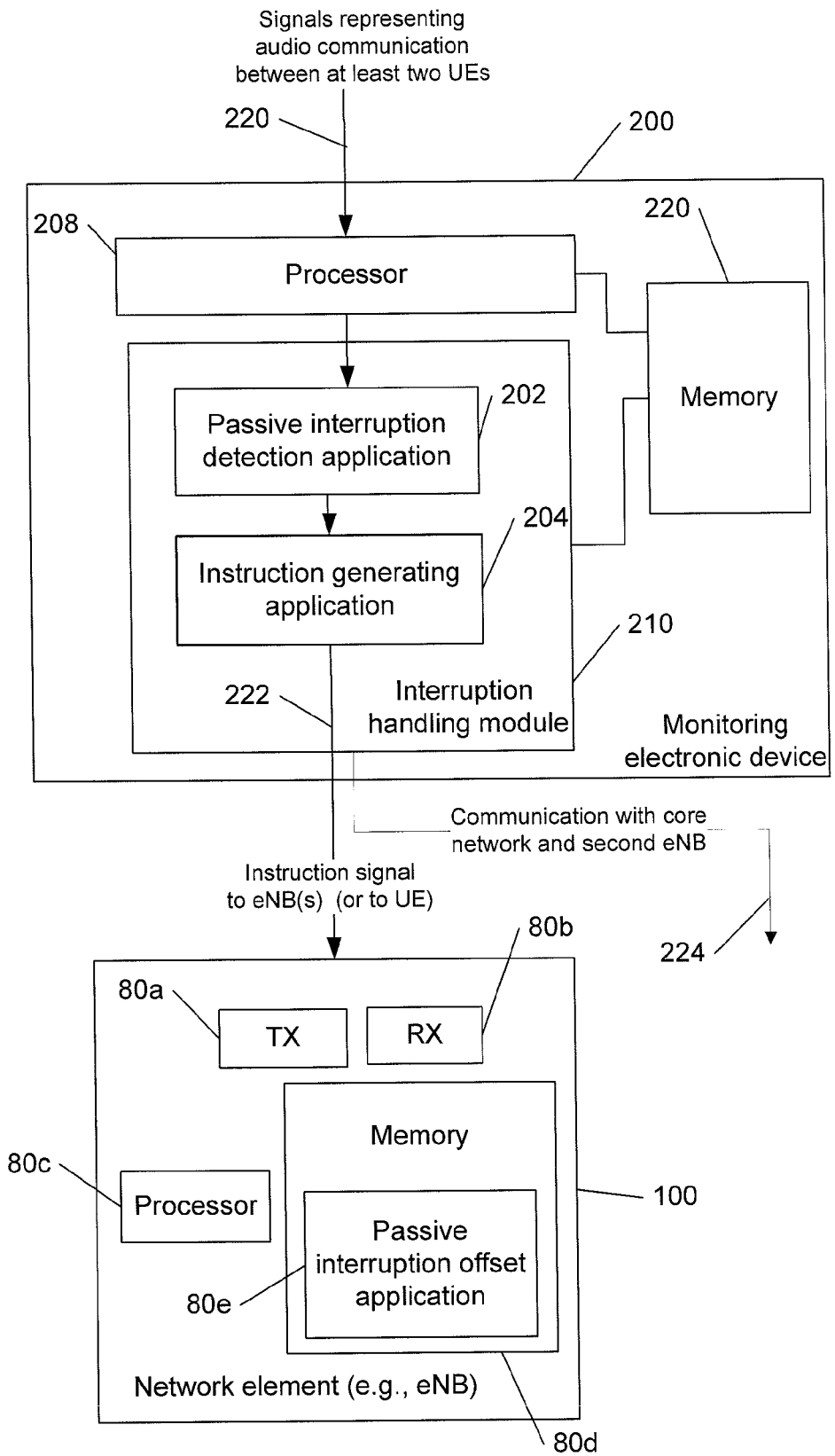
FIG. 5 is a block diagram of exemplary devices for practicing exemplary embodiments of the invention.

In a next step 52, the network element (eNB) selects a technique, if not provided in the instruction from the at least one monitoring electronic device as described herein, for providing the shortened audio delay for the audio data. In a next step 54, the network element (eNB) provides the shortened audio delay for the audio data in one or both communication directions for the audio wireless communication between the at least two UEs FIG. 5 shows an example of a block diagram demonstrating LTE devices including a monitoring electronic device (e.g., an application optimization entity at the random access network edge) 200 and a network element (e.g., eNB) 80 comprised in a network 100, according to exemplary embodiments of the invention. FIG. 5 is a simplified block diagram of various electronic devices that are suitable for practicing the exemplary embodiments of this invention, and a specific manner in which components of an electronic device are configured to cause that electronic device to operate.

The device 200 comprises at least one processor 208, at least one memory 220 and an interruption handling module 210. The device 200 receives signals 220 representing audio communication between at least two UEs. Also the device 200 may provide instructions related to upsetting passive interruptions as described herein via links 222 to eNBs and UEs, and may communicate with a core network and second eNB via link 224. Links 220, 222 and 224 may be wired or wireless links.

Various embodiments of the at least one memory 220 (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 208 include but are not limited to general purpose computers, special purpose computers, microprocessors, digital signal processors (DSPs) and multi-core processors. Similar embodiments are applicable to memories (e.g., memory 80$d$) and processors (e.g., processor 80$c$) in other wireless devices such as eNB or UE 80 shown in FIG. 5.

The interruption handling module 210 may perform at least steps 40-46 shown in FIG. 3 and can comprise passive interruption detection application module 202 to perform, for example, step 40 shown in FIG. 3 and an instruction generating application module 204 to perform, for example, steps 42-46 shown in FIG. 3. The module 210 may be implemented as an application computer program stored in the memory 220, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor. Furthermore, the module 210 may be implemented as a separate block or may be combined with any other module/block of the device 200, or it may be split into several blocks according to their functionality.

The device 80 (e.g., eNB or UE) may comprise, e.g., at least one transmitter 80$a$, at least one receiver 80$b$, at least one processor 80$c$ at least one memory 80$d$ and a passive interruption offset application module 80$e$. The transmitter 80$a$ and the receiver 80$b$ may be generally means for transmitting/receiving and may be implemented as a transceiver, or a structural equivalence thereof.

The passive interruption offset application module 80$e$ may provide various instructions for performing, e.g., steps 50-54 shown in FIG. 4. The module 80$e$ may be implemented as an application computer program stored in the memory 80$d$, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor. Furthermore, the module 80$e$ may be implemented as a separate block or may be combined with any other module/block of the device 80, or it may be split into several blocks according to their functionality.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method, comprising:
   detecting by at least one electronic device one or more unintended interruptions in one or both communication directions in an audio communication between at least two user equipments before each of the one or more interruptions becomes audibly detectable at least at one of the user equipments; and
   in response to the detection, providing an instruction by the at least one electronic device to facilitate a shortened audio delay for audio data in the one or both communication directions to offset the one or more interruptions.

2. The method of claim 1, wherein detecting by at least one electronic device at least one interruption of the one or more interruptions comprises:

detecting a silent interval from a first user equipment of the at least two user equipments followed by a first speech interval of a first user of the first user equipment;

detecting a further silent interval from a second user equipment of the at least two user equipment on s overlapping with the silent interval from the first user equipment, followed by a second speech of a second user of the first user equipment; and detecting that at least one of the following:
the first speech interval has not yet begun playout at the second user equipment, and
the second speech interval has not yet begun playout at the first user equipment.

3. The method of claim 2, wherein each of the silent and further silent intervals is longer than a predetermined value.

4. The method of claim 1, wherein the at least one electronic device is co-located with or a part of one of the at least two user equipments.

5. The method of claim 4, wherein the instruction in response to at least one detected interruption is provided to or within the one of the at least two user equipments to facilitate the shortened audio delay for the audio data in a buffer memory received by the one of the at least two user equipments.

6. The method of claim 1, wherein the at least one electronic device is co-located with or a part of an eNB providing at least partially the audio wireless communication between the at least two user equipments.

7. The method of claim 6, wherein the instruction in response to at least one detected interruption is provided to the eNB to facilitate a shortened audio delay for the audio data sent to the one or at least two user equipments.

8. The method of claim 1, wherein the instruction comprises one or more of:
providing a higher priority of audio data within a video telephone call,
providing a higher priority of audio data for the at least one of the at least two user equipment compared to other user equipments,
using additional radio resources to reduce the audio delay,
compressing audio/video data for a video telephone call, and
modifying packet content by removing silent periods.

9. The method of claim 8, wherein if the instruction comprises modifying packet content by removing silent periods, the instruction further comprise at least one more instruction of the instructions.

10. The method of claim 1, wherein a plurality of the unintended interruptions are detected at a rate for a predefined period of time in the one or both communication directions that exceeds a predetermined threshold value, the method comprising:
providing a further instruction by the at least one electronic device to reduce a total delay for all audio data below a predetermined value in the corresponding one or both communication directions in the audio wireless communication between the at least two user equipments.

11. The method of claim 1, wherein the at least one electronic device is co-located with or a part of an eNB providing the audio wireless communication with a first of the at least two user equipments and is communicating with a core network which further provides the audio wireless communication using a further eNB with a second of the at least two user equipments.

12. The method of claim 11, wherein the instruction at least in part, is sent to the further eNB through the core network to facilitate the shortened audio delay for the audio data for the second of the at least two user equipments.

13. The method of claim 11, further comprising:
receiving by the at least one electronic device from the core network an indication whether there is another electronic device providing instructions for offsetting of unintended interruptions in the second of the at least two user equipments.

14. A method, comprising:
receiving by a network element an instruction from at least one electronic device to facilitate a shortened audio delay for audio data in one or both communication directions in an audio wireless communication between at least two user equipments to offset one or more unintended interruptions; and
providing by the network element the shortened audio delay for the audio data in one or both communication directions for an audio wireless communication between at least two user equipments to offset the one or more interruptions.

15. The method of claim 14, wherein the one or more interruptions are one or more unintended interruptions.

16. The method of claim 14, wherein after receiving the instructions from at least one electronic device the method further comprises:
selecting by the network element a technique for providing the shortened audio delay for the audio data, wherein the technique comprises one or more of:
providing a higher priority of audio data within a video telephone call,
providing a higher priority of audio data for the at least one of the at least two user equipment compared to other user equipments,
using additional radio resources to reduce the audio delay,
compressing audio/video data for a video telephone call, and
modifying packet content by removing silent periods.

17. The method of claim 11, wherein the network element is co-located with or comprises the at least one electronic device, and the network element is an eNB.

18. An apparatus comprising:
at least one processor and a memory storing a set of computer instructions, in which the processor and the memory storing the computer instructions are configured to cause the apparatus to:
detect one or more unintended interruptions in one or both communication directions in an audio communication between at least two user equipments before each of the one or more interruptions becomes audibly detectable at least at one of the user equipments; and
in response to the detection, provide an instruction to facilitate a shortened audio delay for audio data in the one or both communication directions to offset the one or more interruptions.

19. An apparatus comprising: at least one processor and a memory storing a set of computer instructions, in which the processor and the memory storing the computer instructions are configured to cause the apparatus to:
receive an instruction from at least one electronic device to facilitate a shortened audio delay for audio data in one or both communication directions in an audio wireless communication between at least two user equipments to offset one or more unintended interruptions; and
provide the shortened audio delay for the audio data in one or both communication directions for an audio wireless communication between at least two user equipments to offset the one or more interruptions.

\* \* \* \* \*